June 13, 1939.  A. I. ODIER  2,162,180
MEANS FOR MEASURING A QUANTITY OF LIQUID IN A TANK
Filed June 11, 1937     5 Sheets-Sheet 1
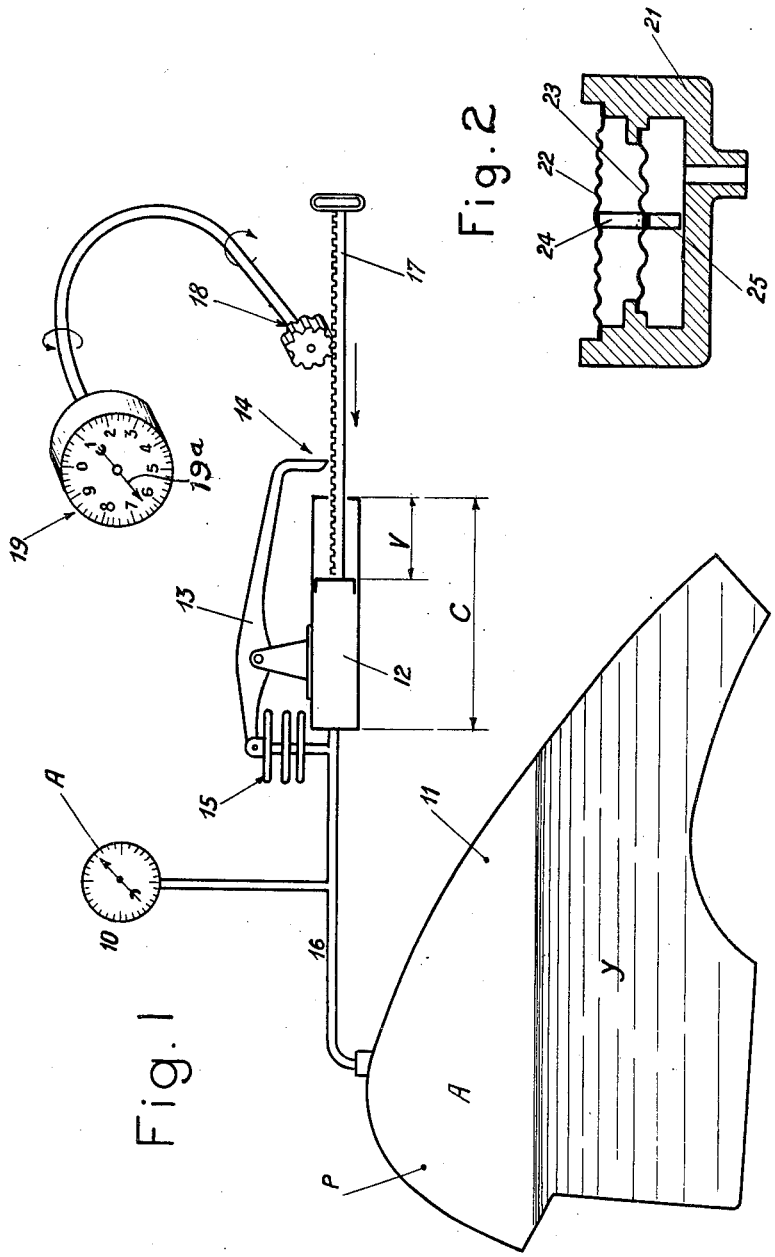
Inventor.
Antoine I. Odier.
By
Stephen Cerstvik
Attorney

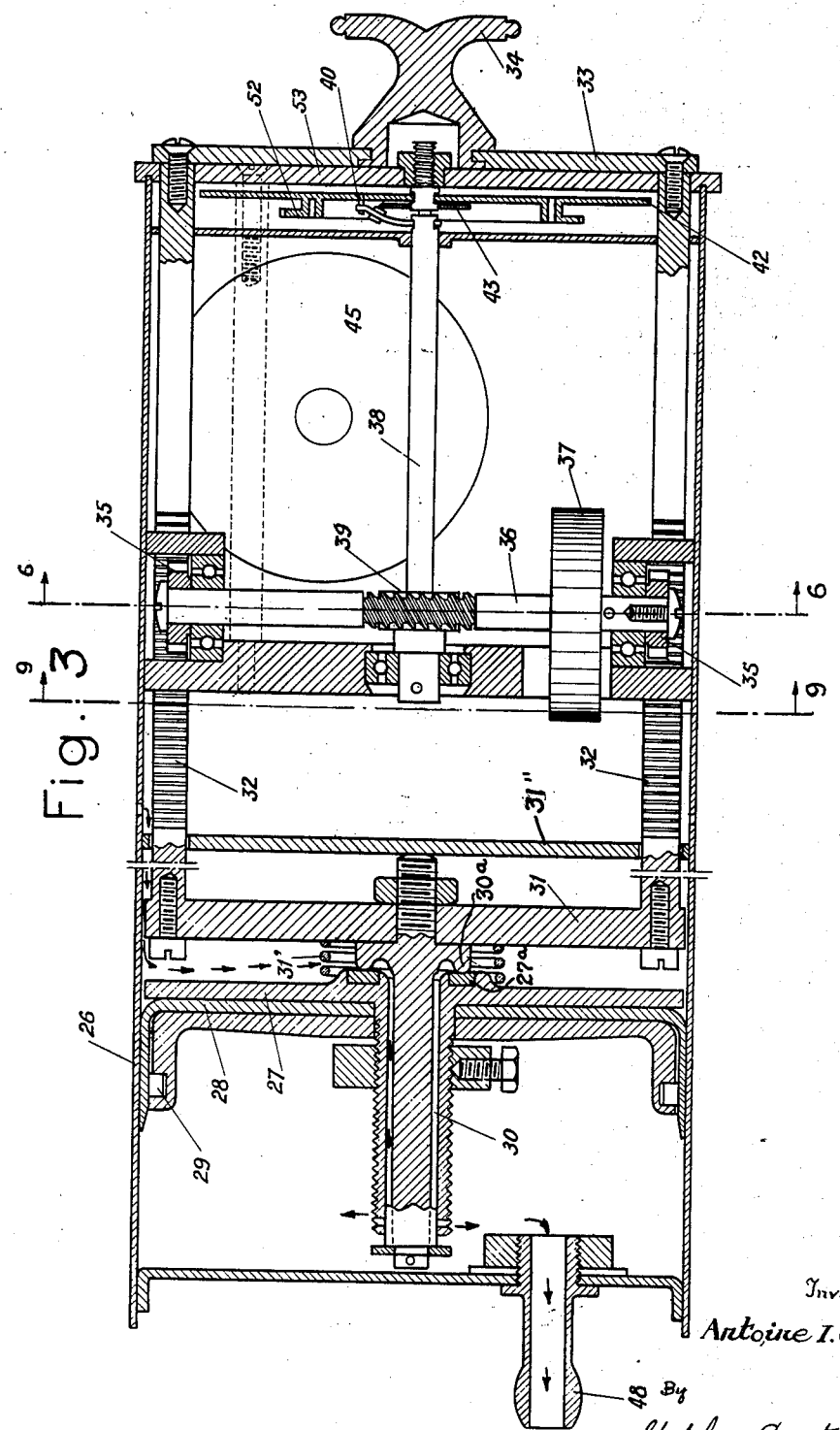

June 13, 1939. A. I. ODIER 2,162,180
MEANS FOR MEASURING A QUANTITY OF LIQUID IN A TANK
Filed June 11, 1937 5 Sheets-Sheet 3

Inventor.
Antoine I. Odier.
By
Stephen Cerstvik
Attorney

June 13, 1939.   A. I. ODIER   2,162,180
MEANS FOR MEASURING A QUANTITY OF LIQUID IN A TANK
Filed June 11, 1937    5 Sheets-Sheet 4

Inventor
Antoine I. Odier.
By
Stephen Cerstvik
Attorney

June 13, 1939.　　　　A. I. ODIER　　　　2,162,180

MEANS FOR MEASURING A QUANTITY OF LIQUID IN A TANK

Filed June 11, 1937　　　5 Sheets-Sheet 5

Inventor.
Antoine I. Odier
By
Stephen Cerstvik
Attorney

Patented June 13, 1939

2,162,180

UNITED STATES PATENT OFFICE 2,162,180

MEANS FOR MEASURING A QUANTITY OF LIQUID IN A TANK

Antoine Isidore Odier, Paris, France

Application June 11, 1937, Serial No. 147,756
In France June 19, 1936

8 Claims. (Cl. 73—290)

The present invention relates to indicating or measuring instruments and more particularly to means for measuring a quantity of liquid contained in a tank.

When it is desired to ascertain the quantity of liquid contained in a tank, one can, for instance, measure with a graduated stick the distance between the bottom of the tank and the level of the liquid. It is clear however that the graduation of the stick must be changed for any variation of the inclination of the tank. In particular, on airplanes, the measure with a graduated stick would give considerable differences depending on whether the airplane is at rest on the ground or in flight, in view of the great difference in the pitch angle. In flight, lateral inclinations would cause absolutely incorrect readings, especially in the case of tanks arranged in the wings and, therefore, being necessarily of a flat form.

Furthermore, correct readings cannot be obtained even for measurements made at the center of a tank having a perfectly spherical form due to the action of the centrifugal force which would cause false readings. Furthermore, vibrations would make the readings uncertain due to the movements imparted to the liquid. Finally, the graduation of such a stick can be equally spaced only for tanks absolutely rectangular, vertical, and with a flat bottom.

Various systems are utilized to automatically measure the height of liquid level and to transmit the indication thereof but whatever may be the devices, the fundamental basis of this measure is subject to the imperfections mentioned above. Thus, it has been impossible to measure the height of liquid either by means of manometric capsules or by measuring the overpressure necessary to balance the height of the liquid to be measured. However, besides the drawbacks of a simple graduated stick, these systems add a further error due to the fact that the density of the liquid intervenes in this measure and that these apparatuses give then the weight of the liquid rather than its volume.

According to the present invention, the volume of liquid contained in a tank is determined by measuring the volume of free space remaining in the tank, which is obtained by measuring the volume of air filling this space. It is evident that, knowing the total volume of a tank, one will obtain at each moment the exact volume of liquid contained therein by noting the difference between the total volume of the tank and the volume of air in said free space.

For measuring this volume of air, the present invention comprises two manners of operation: it is possible, after having closed momentarily and for a short time necessary for the measure, any communication of the tank with the outside air, to inject therein a known volume of air, of a gas, or of a liquid, which would increase the pressure by an amount which is greater when the tank is fuller and which permits calculation of the ratio between the added volume, which is known, and the volume of air to be determined.

This manner of operation permits the provision of simple apparatuses but it requires the application to the tank of variable pressures, which may present, in certain occasions, some disadvantages.

Another manner of operation consists in measuring the quantity of air necessary for producing in the tank a predetermined increase in pressure, the measure of the quantity of air thus introduced serving then as indication of the volume of liquid contained in the tank.

The invention will be better understood from the following description taking into consideration the annexed drawings, it being understood, however, that these drawings are given by way of a non-limiting example.

In the drawings:

Fig. 1 is a diagrammatic view of one form of the invention;

Fig. 2 is a view in longitudinal section of one form of device for compensating for changes in atmospheric pressure;

Fig. 3 is a view in longitudinal, horizontal section of one form of practical embodiment of the invention;

Figure 4:
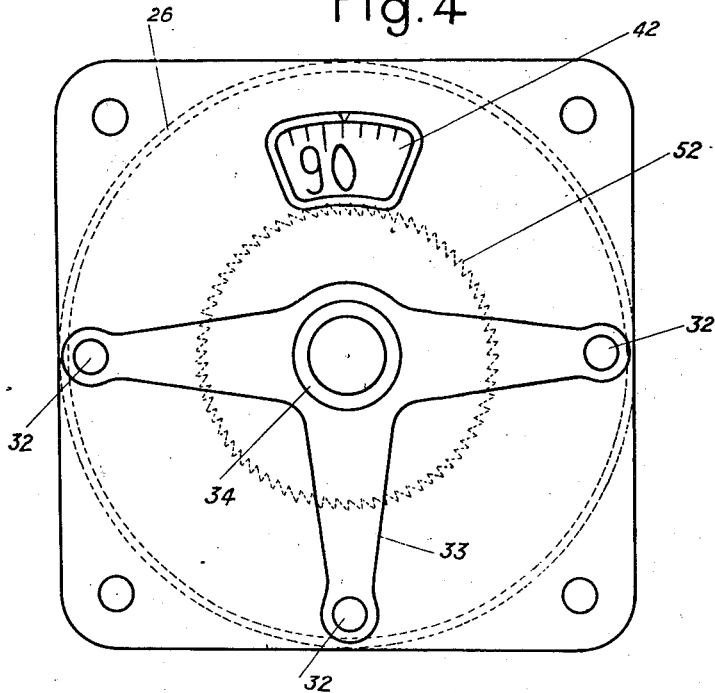
Fig. 4 is a front view of the device as illustrated in Fig. 3.
Figure 5:
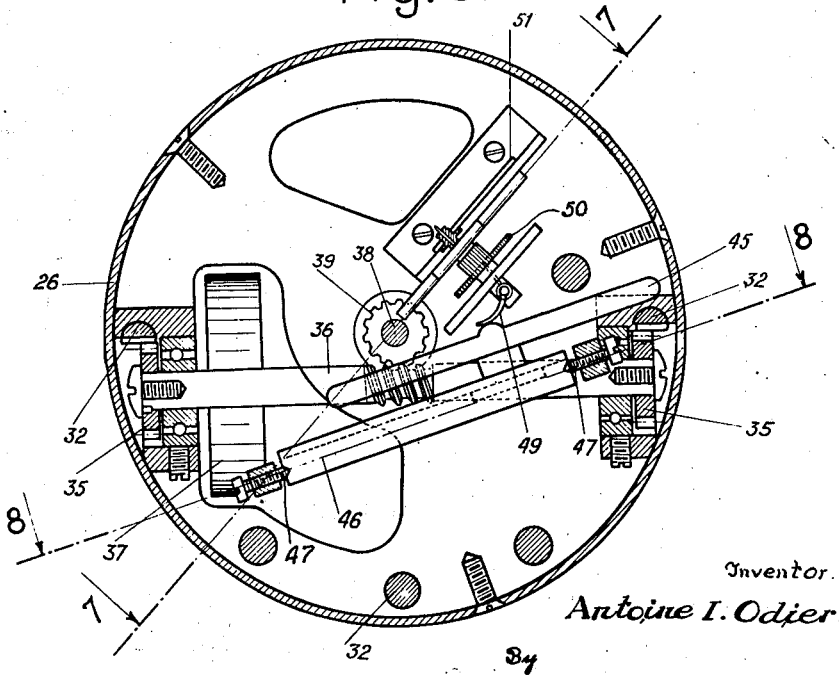
Fig. 5 is a sectional view taken on line 6—6 of Fig. 3.
Figure 6:
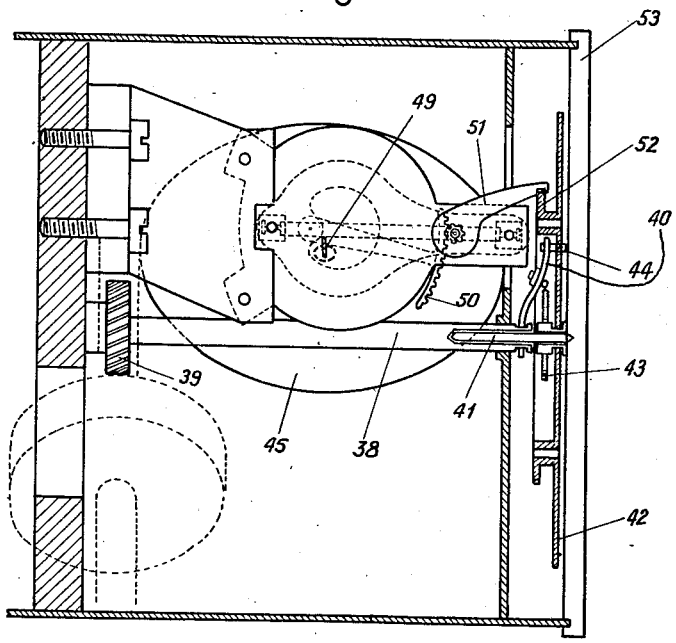
Fig. 6 is a sectional view taken on line 7—7 of Fig. 5.

The measure of the quantity of liquid may be effected, mechanically as indicated in Fig. 1. Taking a tank of any form 11 (Fig. 1), the same is shown as connected by a tube 16 to a cylinder 12 carrying mounted thereon a lever 13 terminated at one extremity by a finger 14 and having its other extremity controlled by a manometric capsule 15 connected to the tube 16. Piston rod 17 of a piston mounted in the cylinder 12 is provided with a rack and may be stopped by finger 14 of lever 13 engaging with the teeth of said rack.

A pinion 18, driven by said rack, controls by an appropriate means, an indicator 19 provided with a pointer 19a and a scale having ten equal divisions and the ratio of transmission is chosen so that a complete revolution of the indicator corresponds to a complete stroke in one direction of the piston.

The operation is as follows: one starts by closing all communication of the tank with the outside air by means of any appropriate device (not shown) which, during a short time interval necessary for a reading, will not hinder the delivery of liquid from the tank to an engine.

The initial pressure in the tank is equal to the outside atmospheric pressure P.

By pushing piston 17 from the right to the left, one introduces into the tank a quantity of air $v$ (Fig. 1) proportional to a certain stroke of the piston, which causes the pressure in the tank to increase by an amount $p$. Provided capsules 15 are suitably calibrated, after the stroke $V_1$ of the piston, they will expand sufficiently to cause finger 14 to stop the piston rod when the desired pressure is obtained and, therefore, pinion 18 and pointer 19a are also stopped to indicate the volume of air added to tank 11.

The increase in pressure being very weak, the heating by compression is absolutely negligible and it is possible then to write that the product of volume by pressure is constant. By designating by C the volume of the cylinder 12 and considering as negligible the volume of the aneroid capsules and tubing connections, it is possible to state that the initial volume of air was $A+C$, at pressure P, which volume was reduced to $A+C-v$ when pressure was increased to $P+p$. Therefore assuming isothermal expansion:

$$P(A+C) = (P+p)(A+C-v)$$

and $$A = \frac{Pv}{p} + v - C$$

By writing $V = A + Y + C$, where V is the total volume of the tank plus that of cylinder 12 and Y is the volume of the liquid to be measured the following is obtained $$Y = V - \frac{Pv}{p} - v$$

When the tank is empty, $Y=0$ and $$\frac{Pv}{p} = V - v = A + C - v$$

However, $v$, which represents then the complete stroke of the piston, has obliged the needle to make a complete revolution, i. e., to give an indication decreasing down to zero. When the tank is not empty, $v$ is different from C and the measure comprises an error which may be as weak as it is desired. Thus, when the tank is full, the needle should stop after an infinitely small displacement of the piston, as it requires only a small stroke to increase the pressure of the air contained in cylinder C by an amount $p$ which shows that the error is insignificant. It is easy to calculate that, as long as the ratio $$\frac{P}{p}$$

remains constant, this reading error remains constant, this reading error remains constant and keeps the same absolute value for each degree of filling of the tank.

It must be noted that, for reading Y and not A, it is necessary to have the dial graduated with increasing numbers in a direction reverse to the movement of the needle which will indicate then the desired difference $$Y = V - \frac{Pv}{p} - v$$

The graduations are equidistant whatever the form of the tank may be.

For instance, if the graduation has been made from 0 to 10, it will be sufficient, with a tank of any form, the capacity of which is not even known, to empty it completely. Then, one tries successive measures and adjusts the stiffness of the capsules 15, or their number, until the needle, stopping exactly after one revolution, indicates exactly zero. At this moment, the apparatus is adjusted, and all the indications which it will give will indicate as capacity a number of tenths of the whole capacity; one will then know that one disposes of $\frac{6}{10}$th, $\frac{9}{10}$th or $\frac{7}{10}$th of the total. If, on the contrary, the total volume of the tank is known, for example 360 liters, it is sufficient to divide the dial in 360 parts and, once the adjustment with empty tank, as above indicated, has been effected, all the measures will be all the more exact the more exactly the intervening factors will be measured; that is to say the volume $v$, which is only a question of mechanical care, and the overpressure $p$ which can be measured with extreme precision with the help of micromanometers.

The same apparatus may be therefore used not only for any form of tanks but also for tanks of any capacity. However, for very small apparatuses and very large tanks, it may happen that the range of adjustment of the capsules be insufficient and that the piston, even moved through its complete stroke, would produce but a very weak overpressure; in that event, the precision of the measure evidently would vary in the same direction as the overpressure.

In such a case, well known integrating means may be used between elements 18 and 19a so that with a tank ten times as large, by making ten strokes with the pump, one will have increased ten times the injected volume $v$, and the same dial, with the same adjustment of the same capsules, may give the same precision.

One may apply this idea to the use of only one apparatus for measuring any number of different tanks; it is a simple question of connections to read the total volume of the liquid contained in tanks communicating only for a short time and only through inlet tubes of a very weak air pressure, or the separate contents of each of the tanks.

Figure 9:
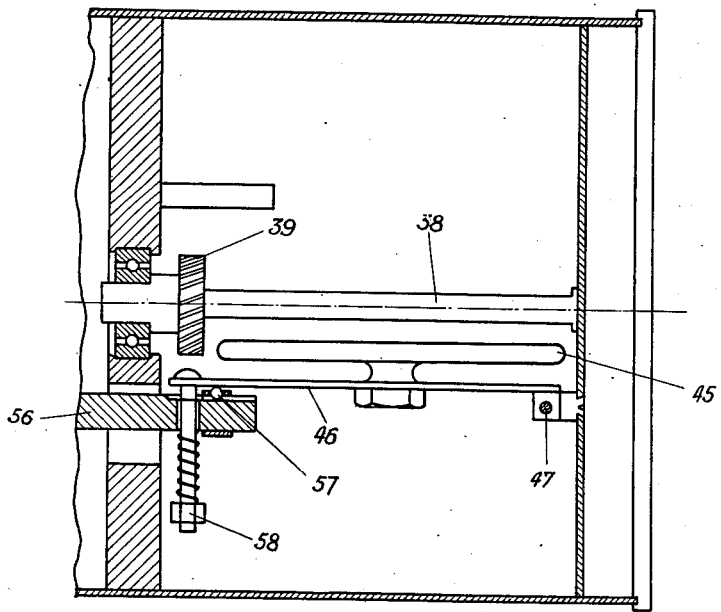
Fig. 9 is a view partially in section taken on the line 10—10 of Fig. 8.
Figure 7:
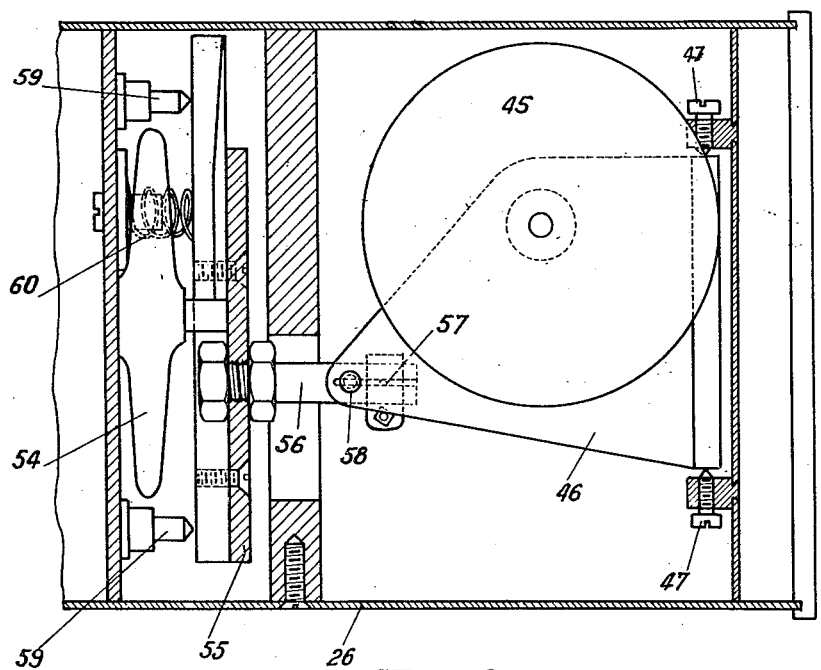
Fig. 7 is a sectional view taken on line 8—8 of Fig. 5.
Figure 8:
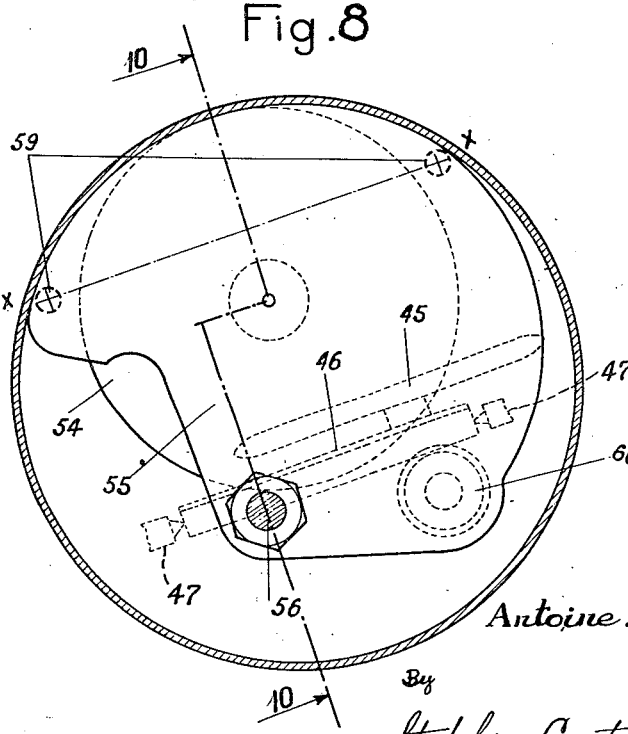
Fig. 8 is a transverse section taken on the line 9—9 of Fig. 3.

In the foregoing, it has been supposed that the atmospheric pressure does not vary, which is not correct. Since in the equation $$Y = V - \frac{Pv}{p} - v$$

the only term that varies with atmospheric pressure is $$\frac{Pv}{p}$$

it is sufficient to note that one will always have the same reading Y and, consequently, the same air, is connected to a plate 55. Plate 55 is resiliently biased against pivot 59, 59 by spring 60. Any variation of pressure rocks plate 55 about axis X—X, see Fig. 8, to produce a displacement of a rod 56 which maintains a permanent contact by the intermediary of a ball 57 and a spring pressed rod 58, with the plate 46 carrying the aneroid capsule 45, (see Fig. 9). Well known means are provided to adjust the movement of the aneroid capsule 54 transmitted to the support of the aneroid 45.

The operation is as follows: The piston 27 is moved to the right by a pull exerted upon button 34. This pull is exerted against the force of spring 37 until the zero reading on the dial appears. While piston 27 is moving to the right, spring 31' urges the piston 27 away from member 31 so that the cooperating valve elements 30a and 27a are maintained in a separated position and air passes from the right hand side of piston 27 to the left hand side thereof by the path shown by the arrows in Fig. 3, elements 30a and 27a being separated sufficiently to allow such passage. Upon release of the knob 34, spring 37 moves element 31 and the piston 27 to the left to build up the pressure on the left hand side of piston 27. As said pressure builds up, spring 31' is overcome and the cooperating valve elements 27a and 30a are brought into abutting relation to close the air passage from the right hand to the left hand side of piston 27. As soon as the proper pressure is obtained, said pressure acting on element 45 actuates finger 49 to engage sector 50 and thereby transmit the movement to pawl 51 which in turn locks dial 42 in position so that the quantity of air forced into the tank is indicated by the dial. The spring 37 continues, however, to operate until its limit of expansion is reached, at which time spring 31' exerts its force against element 31 and the cooperating valve elements 30a and 27a are disengaged, allowing escape of the air pressure until atmospheric pressure is reached so that element 45 allows pawl 51 to release the dial which is thereby returned to its starting position.

It is to be noted that the force transmitted by element 45 is at all times subjected to the influence of atmospheric pressure since aneroid 54 oscillates plate 55 to determine the position of plate 46 supporting the element 45. The determination of the quantity of liquid in the tank is therefore controlled by the effect of atmospheric pressure, so that errors due to changes in atmospheric pressure are thereby compensated.

I claim:

1. In a device for measuring the quantity of liquid in a container, means temporarily isolating a body of fluid above the level of said liquid whereby the volume of said fluid varies inversely as said level varies, means for changing the quantity of said fluid to produce a desired pressure in said container, means for indicating the variation in said quantity, pressure responsive means responsive to the pressure in said container, means actuated by said pressure responsive means for stopping said quantity changing means at said desired pressure whereby said quantity change may be ascertained, and means responsive to the atmospheric pressure for varying the response of said pressure responsive means.

2. In a device for measuring the quantity of liquid in a container, means temporarily isolating a body of fluid above the level of said liquid whereby the volume of said fluid varies inversely as said level varies, means for changing the quantity of said fluid to obtain a desired pressure in said container, said means comprising a moving piston, an indicating member, means movable by said piston to position said indicating member at its zero indication at one extreme of travel of said piston, means responsive to the desired pressure in said container for locking said indicator at another position thereof and means responsive to atmospheric pressure changes whereby the effect of said pressure responsive means is varied.

3. In a device of the character described, a cylinder, a movable piston mounted for reciprocation in said cylinder, means whereby said piston may be reciprocated, an indicator, means responsive to the position of said piston for actuating said indicator, pressure responsive means for locking said indicator in any desired position thereof and means responsive to the pressure of the atmosphere for modifying the action of said pressure responsive means.

4. In a device of the character described, a container, pressure generating means mounted for movement in said container, indicating means responsive to the position of said mounted means, means for moving said mounted means whereby a pressure may be produced thereby, means responsive to the pressure produced for locking said indicating means and means responsive to the pressure of the atmosphere for controlling the action of said pressure responsive means.

5. In a device of the character described, a casing, a movable piston mounted for reciprocation in said casing, means for moving said piston in one direction, valve means actuated to one position by said movement, means for moving said piston in the other direction, said valve means being actuated to another position upon said last mentioned movement, indicating means for indicating the relative motion of said piston, said piston generating pressure upon movement in one direction thereof, and pressure responsive means for locking said indicating means in one position thereof when said pressure reaches a predetermined value.

6. In a device of the character described, a casing, means movable in said casing for producing a pressure therein upon said movement, indicating means for indicating the relative position of said movable means, means responsive to said pressure for locking said indicating means in position at a predetermined pressure, and means responsive to change in atmospheric pressure for varying the effect of said pressure responsive means.

7. In a device of the character described, a cylinder, a piston in said cylinder, an inlet to said cylinder leading to one side of said piston, an outlet leading to the other side of said piston, means for reciprocating said piston and means cooperating therewith whereby air admitted on one side thereof may be compressed and emitted from the other side thereof, means actuated by the motion of said piston for transmitting said motion, an indicating element for indicating the relative position of said piston connected to said transmitting means and means responsive to the differential pressure on the opposite sides of said piston for locking said indicator in one position thereof, while said piston continues its normal movement.

8. In a device for measuring the quantity of liquid in a container, means for compressing a value of A for an injected volume $v$ corresponding previously to the indications read, if the ratio $$\frac{p}{P}$$

is maintained constant by an aneroid mechanism. Upon a decrease of barometric pressure of one-half, for instance, a decrease of one-half of the overpressure necessary to produce the locking is required.

One embodiment of the device for maintaining the pressure ratio constant is illustrated in Fig. 2 which may, for instance, be applied to replace element 15 of Fig. 1. A capsule similar to aneroid boxes is constituted by a circular metallic member 21 forming the peripheral wall of the capsule and two slightly different corrugated flexible diaphragms, 22 and 23, having areas designated by S and s respectively. The smaller surface 23 may be subjected to the pressure inside of tank 11. If the space between the two diaphragms 22 and 23 is evacuated of air but the same are interconnected by a spacing rod 24, the large partition will be subjected to a downwardly directed effort $PS$, whilst the small surface 23 will be subjected to an upwardly directed effort $(P+p)s$. When $p=o$, the capsule will move downwardly as the upper surface 22 has the larger area and rod 25 will abut casing 21. The diaphragms are maintained in this position until a predetermined increase in pressure occurs in the tank with respect to atmospheric pressure so as to balance this difference in areas of the diaphragms. Upon such a balance, element 22 may be utilized to actuate element 14 of Fig. 1 in order to stop the pump, and the equation of balance may be written as follows: $PS=(P+p)s$ or $Ps+ps=PS$.

Whence:

(I) $\quad \frac{p}{P}=\frac{S}{s}-1$ which is constant

Therefore, in order to attain a lifting of the rod 25, movement which may be used to lock element 17 of Fig. 1 to stop the pump etc. . . . it is necessary to produce an overpressure whose ratio to the atmospheric pressure of the place is a constant, which is exactly the result desired.

The heating by compression, though negligible, is not however inexistent. By using the same notations, the equation of adiabatic compression of volume $A+C$ at pressure P, to a volume A at pressure $P+p$, may be written as follows:

hence
$$P(C+A)^\gamma=(P+p)A^\gamma$$

whence
$$\left(\frac{C+A}{A}\right)^\gamma=\frac{P+p}{P}$$

and
$$\left(\frac{C}{A}+1\right)^\gamma=\frac{p}{P}+1 \text{ or } \frac{C}{A}+1=\left(\frac{p}{P}+1\right)^{\frac{1}{\gamma}}$$

from which
$$\frac{C}{A}=\left(\frac{p}{P}+1\right)^{\frac{1}{\gamma}}-1$$

but
$$\frac{C}{A}=\left(1+\frac{p}{P}\right)^{\frac{1}{\gamma}}-1$$

$$\frac{p}{P}=\frac{S}{s}-1 \text{ from Equation I}$$

whereby:
$$\frac{C}{A}=\left(\frac{S}{s}\right)^{\frac{1}{\gamma}}-1$$

This formula shows that one has a measure which is absolutely independent of the atmospheric pressure and that the volume A to be measured depends but on the precision of volume C and the true value of $\gamma$. But this figure supposed to be equal to 1 for facility of explanation and corresponding then to an isothermic compression is equal to 1.41 in the case of the adiabatic. Experience shows that the true figure is an intermediate one; it varies with the length of the piping, the speed of compression, but remains constant for a given case, so that the precision may be as great as it is desired.

A practical embodiment where atmospheric pressure variations are compensated and particularly applicable to airplane tanks is shown by way of example in Figures 3 to 9.

Referring to Fig. 3, the apparatus comprises a cylinder 26, containing a piston formed of a plate 27, a stamped sealing member 28, and a tightening ring 29 cooperating to provide absolute tightness even at very small pressures. This piston may be pulled to the right preliminary to compression by a central splined axle 30 secured to a supporting member 31 rigidly connected to rods 32 having their opposite extremities interconnected by a second supporting member 33 provided with a control button 34.

When supporting member 31 is pulled to the right its complete limit of movement, it abuts partition 31. Rods 32 are provided with racks meshing with two pinions 35 (Figures 3 and 5) driving a shaft 36 mounted on ball bearings and carrying a spiral spring 37 which is wound up when member 31 is pulled to the right. Shaft 36 at its middle is formed to provide a worm adapted to drive a shaft 38 by means of a worm gear 39. This shaft 38, which may be seen in Figs. 5 and 6, carries an arm 40, Fig. 6. On a pivot shaft 41 of the kind used in watch mechanisms there is mounted a graduated dial 42 provided at one point with a pin 44 projecting into the path of movement of the arm 40 and connected at another point to one end of a spiral spring 43 having its other end connected to the arm 40, this spring being arranged to urge the dial in a direction to cause the pin 44 to press against the arm 40. The direction of rotation is so shown that when shaft 38 is rotating in one direction during the movement of the piston 27 toward the right under the action of a pull exerted on the button 34, the arm 40, being pressed against the pin 44, causes the dial to rotate until the end of the stroke in this direction, that is, until a zero indication is presented by the dial, while upon the reverse movement of the piston 27 the shaft 38 being rotated in the opposite direction, the dial follows the arm 40 under the action of the spring 43 until it is arrested by the ratchet 51, as is set out in greater detail below, the arm 40 continuing its movement with the shaft 38 by winding up the spiral spring 43.

An aneroid capsule 45 (Figs. 3, and 5 to 9) is fixed on a plate 46 oscillating on pivots 47 supporting said plate at one end thereof. This aneroid capsule is in constant communication (not shown) with a tube connecting the tank to be measured with a fitting 48, (Fig. 3) of the air outlet of the cylinder. A finger 49 (Figs. 5 and 6) capable of oscillation upon deformation of the aneroid capsule engages sector 50 and, transmits its displacements thereto which actuates a pawl 51. This pawl may engage with teeth of a ratchet wheel secured to the dial 42 to stop the rotation thereof, as is set out in detail later. A cover 53 is provided with an opening permitting to observe a portion of the dial 42 (Fig. 4). A second aneroid capsule 54 (Figs. 7 and 8) evacuated of medium to produce a desired pressure, means responsive to said pressure, an indicating mechanism for indicating the quantity of said medium compressed, and means actuated by said pressure responsive means for controlling said indicating mechanism, means responsive to the atmospheric pressure for controlling the operation of said pressure responsive means, means connecting said container to said pressure producing means and means connecting said pressure responsive means to said container whereby said indicator is controlled by the pressure within said container.

ANTOINE ISIDORE ODIER.